United States Patent [19]

Skinner et al.

[11] Patent Number: 5,507,500
[45] Date of Patent: Apr. 16, 1996

[54] EXPANDABLE COMPRESSION RING WITH LOCKING MEMBERS

[75] Inventors: James W. Skinner, Fort Wayne; Michael R. Miller, Churubusco; Fouad M. Deeb; William O. Skinner, both of Fort Wayne, all of Ind.

[73] Assignee: Press-Seal Gasket Corporation, Fort Wayne, Ind.

[21] Appl. No.: 205,607

[22] Filed: Mar. 3, 1994

[51] Int. Cl.$^6$ .............................. F16J 15/10; B23P 19/00
[52] U.S. Cl. ........................ 277/9; 277/199; 277/207 A; 277/219; 285/370; 285/397
[58] Field of Search ................................ 277/9, 128, 129, 277/147, 148, 192, 198, 199, 218, 219, 221, 207 A; 285/15, 370, 194, 338, 397, 390; 138/97, 98

[56] References Cited

U.S. PATENT DOCUMENTS

| | | | |
|---|---|---|---|
| 1,172,369 | 2/1916 | Kottusch | 277/219 |
| 1,225,101 | 5/1917 | Ballmer | 277/219 |
| 3,101,743 | 8/1963 | Hoke. | |
| 3,141,687 | 7/1964 | Broberg et al. | 285/397 |
| 3,960,395 | 6/1976 | Cirule et al. | 285/370 |
| 4,191,390 | 3/1980 | Wolf et al. | 277/219 |
| 4,746,127 | 5/1988 | Westhoff et al. | 277/207 A X |
| 4,864,684 | 9/1989 | Gellenthin, Jr. . | |
| 4,890,863 | 1/1990 | Westhoff et al. . | |
| 5,029,907 | 7/1991 | Gundy | 285/194 X |
| 5,042,532 | 8/1991 | Gilleland | 138/97 X |
| 5,054,794 | 10/1991 | Westhoff et al. . | |
| 5,150,927 | 9/1992 | Skinner . | |
| 5,213,341 | 5/1993 | Griffiths | 277/199 X |

FOREIGN PATENT DOCUMENTS

| | | | |
|---|---|---|---|
| 2293858 | 12/1974 | France . | |
| 476019 | 11/1937 | United Kingdom | 277/221 |

*Primary Examiner*—Scott W. Cummings
*Attorney, Agent, or Firm*—Barnes & Thornburg

[57] ABSTRACT

An apparatus for outwardly radially compressing a gasket into sealing engagement with a wall of an opening includes a continuous strip of resiliently flexible material having first and second ends and first and second members. The first and second members are made from a different material than the strip and are respectively attached to the first and second ends of the strip to thereby form a ring. The first and second members are configured to include locking structure that both fixes the ring in an expanded position adjacent to the gasket and secures against contraction of the ring by the gasket. The apparatus may be made from a plurality of continuous strips of resiliently flexible material and have structure for aligning and securing the first end of each one of the strips adjacent the second end of another of the strips to form a closed ring. The aligning and securing structure includes at least one set of the first and second members.

33 Claims, 3 Drawing Sheets

U.S. Patent     Apr. 16, 1996     Sheet 1 of 3     5,507,500
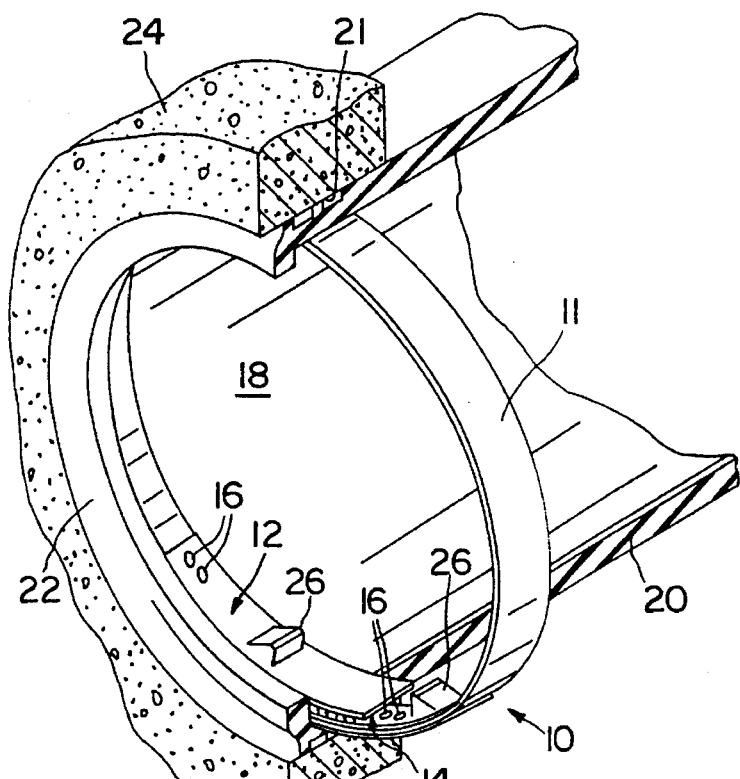
FIG. 1
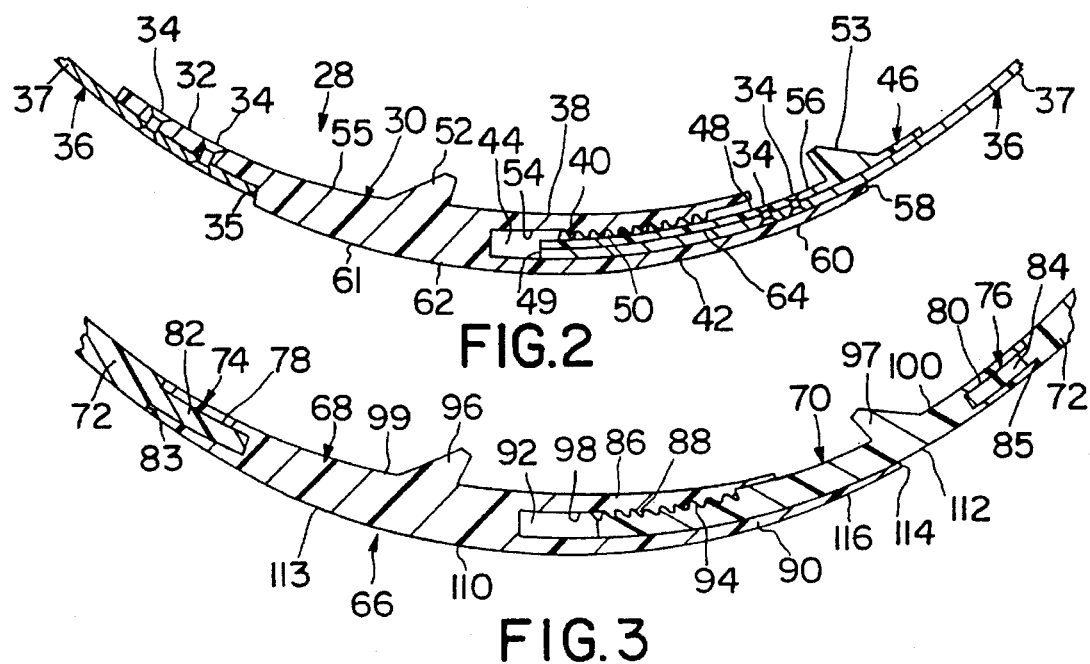
FIG. 2
FIG. 3

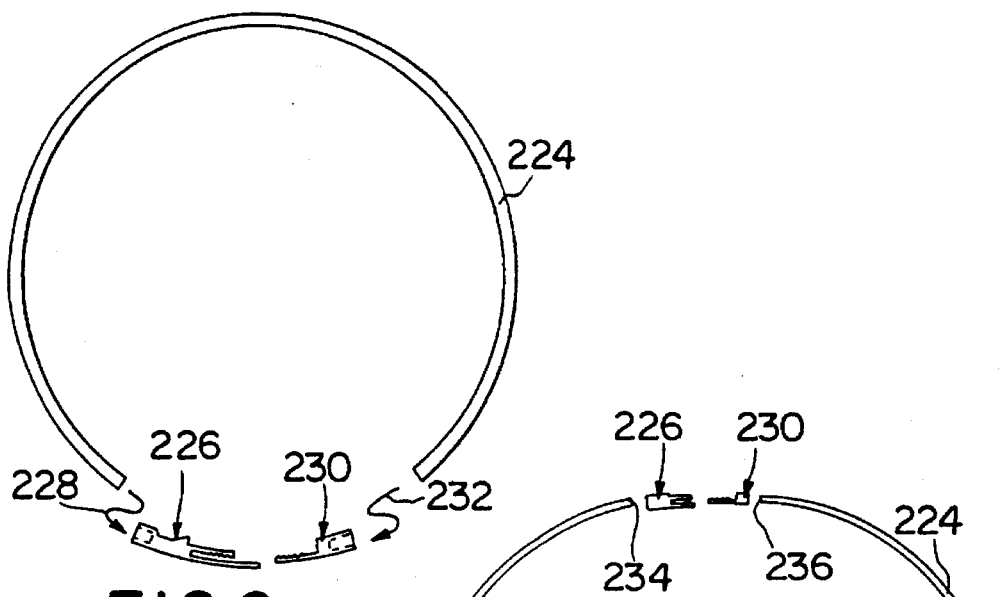
FIG. 6
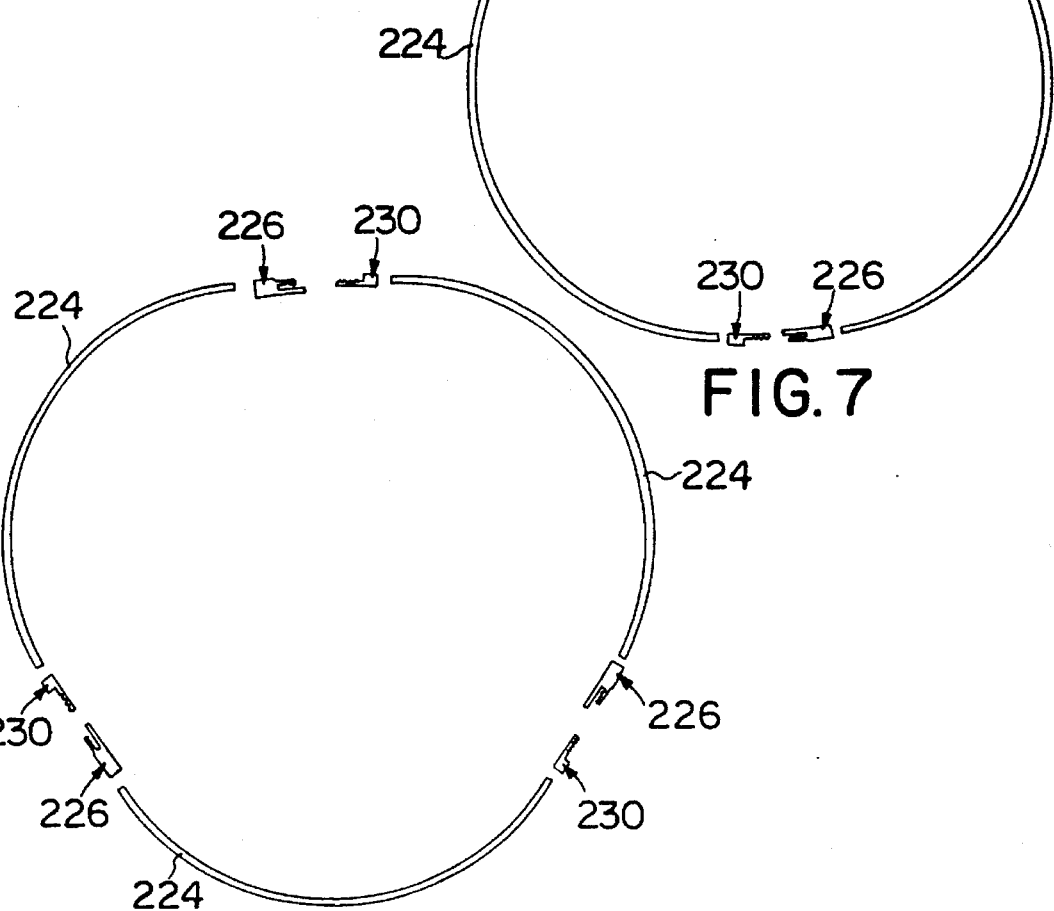
FIG. 7
FIG. 8

EXPANDABLE COMPRESSION RING WITH LOCKING MEMBERS

BACKGROUND AND SUMMARY OF THE INVENTION

The present invention relates to an expandable seal arrangement. More particularly, the present invention relates to an expandable compression ring with molded locking members for exerting an outward, radially directed force on an inner surface of a gasket to compress the gasket into sealing engagement with a wall of an opening.

Compression rings may be used to clamp an exterior surface of a resilient gasket surrounding a pipe into sealing engagement with a wall of an opening in which the pipe is inserted. The gasket is typically constructed from an elastomeric material and, when clamped into position, provides a fluid-tight seal between the pipe and the opening. Clamping is accomplished by expanding the compression ring against an interior surface of the gasket.

Expandable compression rings may be formed from either a unitary plastic or metal, such as stainless steel. Utilization of unitary plastic rings has some drawbacks. First, a unitary construction requires that an entire plastic band be formed from a relatively expensive, high strength material. The high strength material is necessary around the areas where an expansion tool is connected to the ring during clamping of the gasket in the opening of a manhole. Pressure on the order of several hundred pounds per square inch is exerted by such an expansion tool. In addition, the locking structure of a plastic ring that secures the ring in an expanded position is subjected to large forces and thus requires a high degree of strength. Another drawback of forming expandable compression rings from plastic is that a separate mold is required for each ring that is designed to be used in conjunction with a particular range of opening diameters. These molds are expensive. The expense for such molds is particularly difficult to bear for larger sized opening diameters where market demand drops off rapidly.

Plastic expandable compression rings, however, do have advantages. One of these advantages is that plastic expandable compression rings can be integrally formed from a molding process that does not require separate forming steps, such as welding, often required when rings are made from metal. Thus, the manufacturing associated with plastic rings can be less labor intensive and less expensive than with metal rings, particularly where market demand is high. Another advantage of plastic rings is that they are not subject to corrosion. Rings made from metal can corrode due to the hostile environment in which compression rings are often used. Chemical elements such as sulfur and compounds such as sulfuric acid can, over time, corrode and degrade the structural integrity of rings made from metal.

Metal expandable compression rings, however, do have advantages. One of these advantages is that metal expandable compression rings do not require molds to be formed. Such rings can be stamped rather than formed from a mold. Certain sizes of metal rings may thus be cheaper to manufacture where market demand is lower even though manual labor may be necessary for their partial assembly. The materials costs for metal rings made from such things as stainless steel are also less expensive than unitary reinforced plastic rings. Finally, metal rings do not suffer from a buckling or creeping problem occurring in some plastic rings.

A problem that exists with the use of expandable compression rings constructed either from metal or plastic is that they are formed so as to only accommodate a particular range of opening diameters. A modular design that would allow multiple strips of various lengths to be connected together to accommodate a particular range of opening diameters would reduce the number of plastic molds and metal stamping machines that would need to be constructed. This would help reduce costs both associated with constructing such machines and providing floor space and operators for them.

An expandable compression ring that solved some or all of the above-described problems associated with the use of expandable compression rings constructed from a unitary plastic or metal would be a welcome improvement. Accordingly, the present invention provides an apparatus for outwardly radially compressing a gasket into sealing engagement with a wall of an opening. The apparatus includes a continuous strip of resiliently flexible material having first and second ends. The apparatus further includes first and second integrally molded members. Structure is provided for attaching the first and second molded members adjacent respective first and second ends of the strip. Finally, structure is provided on the first and second members for locking the strip in an expanded position. Further structure may be provided on the first and second molded members for cooperating with a force exerting structure for moving the strip into the expanded position. The cooperating structure may include a plurality of installation lugs. At least one lug may be formed on one of the molded members and a recess or recesses may be formed in the other molded member.

The peripheries of the strip and the molded members may present a substantially continuous and uninterrupted exterior circumferential surface so that the apparatus exerts a generally uniform pressure on an inner surface of the gasket. The molded members may have radii of curvature designed to accommodate a range of gasket diameters so that the molded members and strip present the substantially continuous and uninterrupted exterior circumferential surface and exert a generally uniform pressure of an inner surface of the gasket. An edge portion of the first molded member and a portion adjacent thereto may taper so as to facilitate the provision of the substantially continuous and uninterrupted circumferential surface.

The strip may be made from either plastic or stainless steel. The molded members may be made from either a reinforced plastic, such as glass-fiber-reinforced nylon 6/6, or, alternatively, a non-reinforced plastic.

When the strip is made from metal, the attaching structure may include a plurality of rivets. When the strip is made from plastic, the attaching structure may include tenons formed on the first and second ends of the plastic strip that are disposed in mortises formed in the molded members. Open mortise and tenon joints may be secured by one or more rivets, closed mortise and tenon joints may be secured with an adhesive applied between the mortise and tenon.

Structure may be formed on the first molded member for capturing the second molded member so as to secure the second molded member during expansion of the strip. The capturing structure may include a first ledge portion and a second ledge portion extending in the same general direction as the first ledge portion so that the first and second ledge portions define a cavity into which at least a portion of the second molded member is disposed.

Guide structure may be on the first and second members that limits lateral movement of the first and second members relative to one another. In one embodiment, the guide structure includes a tab on each of two opposing sides of the first member that engage opposing sides of either the strip or the second member. The guide structure of this embodiment further includes a tab on each of the opposing sides of the second member that engage the opposing sides of the first member.

The locking structure may include integrally molded, cooperating projections. The projections may be teeth-like structures on the first and second molded members that are angled in generally opposite directions.

The strip and molded ends may be expandable into multiple lock positions.

Another embodiment of the present invention includes an apparatus having a plurality of continuous strips of resilient flexible material. Each of the strips has first and second ends. The apparatus also includes structure for aligning and securing the first end of each one of the strips adjacent the second end of another of the strips so as to form a closed ring. The aligning and securing structure includes at least one set of first and second integrally molded members. Structure is provided for attaching the first and second molded members to respective ends of adjacent strips. Structure is further provided on the first and second molded members for locking the closed ring in an expanded position.

Structure may be provided on the first and second molded members for cooperating with a force exerting structure for moving the strips into the expanded position.

The strips may be made from either plastic or stainless steel. The molded members may be made from either a reinforced plastic, such as glass-fiber-reinforced nylon 6/6, or, alternatively, a non-reinforced plastic.

The molded members of the apparatus may have radii of curvature designed to accommodate a range of opening diameters so that the strips and the molded members present a substantially continuous and uninterrupted exterior circumferential surface on an inner surface of the gasket. Edge portions of the first molded member and a portion adjacent thereto may taper so as to facilitate the provision of the substantially continuous and uninterrupted circumferential surface.

When the strips are made from metal, the attaching structure may include a plurality of rivets. When the strips are made from plastic, the attaching structure may include tenons formed on the first and second ends of the strips that are disposed in mortises formed in the molded members. Open mortise and tenon joints may be secured by one or more rivets. Closed mortise and tenon joints may be secured with an adhesive applied between the mortise and tenon.

Structure may be provided on the first molded member for capturing the second molded member so as to secure the second molded member during the expansion of the strips. The capturing structure may include a first ledge portion and a second ledge portion extending in the same general direction as the first ledge portion so that the first and second ledge portions define a cavity into which at least a portion of the second molded member is disposed.

Guide structure may be on the first and second members that limits lateral movement of the first and second members relative to one another. In one embodiment, the guide structure includes a tab on each of two opposing sides of the first member that engage opposing sides of either the strip or the second member. The guide structure of this embodiment further includes a tab on each of the opposing sides of the second member that engage the opposing sides of the first member.

The locking structure may include integrally molded cooperating projections.

The first and second members may provide a range of adjustability of the circumference of the closed ring. In addition, the aligning and securing structure may include two or more sets of first and second integrally molded members that provide an additional range of adjustability of the circumference of the closed ring.

Other objects, advantages and novel features of the present invention will become apparent from the following detailed description of the invention when considered in conjunction with the accompanying drawings.

BRIEF DESCRIPTION OF THE DRAWINGS

FIG. 1 illustrates a perspective view of an expandable compression ring having molded members in accordance with the present invention.

FIG. 2 shows a partial side view of an embodiment of an expandable compression ring having a pair of molded members attached to a metal strip.

FIG. 3 shows a partial side view of an embodiment of an expandable compression ring having a pair of molded members attached to a plastic strip.

FIG. 6 illustrates a side view of a single strip formed from either metal or plastic having a pair of molded members.

FIG. 7 illustrates a side view of a pair of strips that can be made from either plastic or metal with two pairs of molded members used to interconnect the strips.

FIG. 8 illustrates a side view of three strips and three pairs of molded members used to interconnect the strips.

DETAILED DESCRIPTION OF THE DRAWINGS

Figure 4:
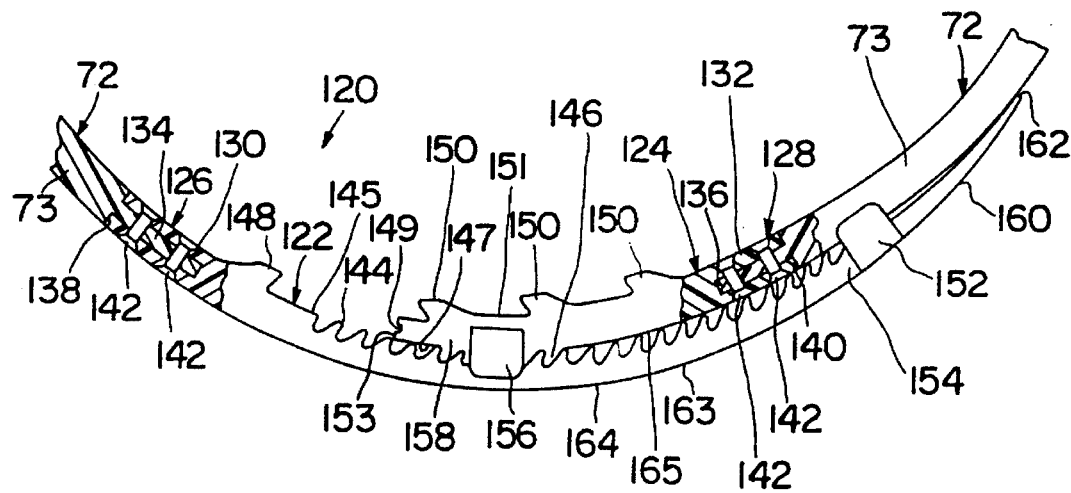
FIG. 4 shows a partial side view of another embodiment of an expandable compression ring having a different pair of molded members attached to the plastic strip.

FIG. 1 shows a perspective view of an expandable compression ring 10 in accordance with the present invention. Expandable compression ring 10 includes a strip 11 that surrounds a pipe (not shown) and respective first and second integrally molded members 12 and 14 attached thereto via fasteners 16. Strip 11 of compression ring 10 is formed from either plastic or metal. Compression ring 10 is designed to exert a generally uniform, outward, radially directed pressure against an inner surface 18 of a gasket 20 so as to seal gasket 20 against a wall 21 of an opening 22 in a manhole 24.

Compression ring 10 is expandable into at least one locked position via engagement of installation lugs 26 formed on first and second members 12 and 14 with an expansion tool (not shown). First and second members 12 and 14 may be constructed from a reinforced plastic, such as glass-fiber-reinforced nylon 6/6 or, alternatively, a non-reinforced plastic which are capable of being subjected to the large forces presented by the expansion tool and required to maintain expandable compression ring 10 in a locked position. Strip 11, as described above, may be constructed from either weaker plastic or metal, such as stainless steel. Both of these materials are relatively less expensive than the reinforced or non-reinforced plastic from which members 12 and 14 are constructed. Thus, expandable compression ring 10 is less expensive to manufacture than rings formed entirely of the reinforced or non-reinforced plastic from which members 12 and 14 are made.

FIG. 2 shows a partial side view of an embodiment of an expandable compression ring 28 of the present invention. Ring 28 includes a first integrally molded member 30 having an attachment portion 32. Fasteners, such as rivets 34, attach member 30 adjacent a first end 35 of metal strip 36. First molded member 30 includes a first ledge portion 38 having a plurality of teeth 40 formed on inner surface 54 of first ledge portion 38, which are angled in a first direction, and a second ledge portion 42 extending in the same general direction as first ledge portion 38 so as to form a cavity 44. A portion of a second integrally molded member 46 is disposed within cavity 44. Second molded member 46 includes an attachment portion 48 for attachment adjacent a second end 49 of metal strip 36 via fasteners such as rivets 34. In one embodiment, metal strip 36 is made from stainless steel and first and second molded members 30 and 46 are constructed from glass-fiber-reinforced nylon 6/6.

Second molded member 46 includes a plurality of teeth 50 formed on inner surface 56 that are angled in a second direction generally opposite that of teeth 40 so that teeth 40 and 50 engage one another and lock compression ring 28 into one of its multiple expanded positions. Installation lugs 52 and 53, formed on respective inner surfaces 55 and 56 of respective first and second molded members 30 and 46, are used in conjunction with an expansion tool (not shown) for expanding ring 28 into one of its multiple locked positions. The ability to expand ring 28 into multiple locked positions allows for a range of opening diameters to be accommodated.

Portion 60 of first molded member 30 tapers to an end 58 to facilitate the provision of a substantially continuous and uninterrupted circumferential surface 61. Surface 61 of ring 28 is designed to provide a generally uniform pressure surface area on inner surface 18 of gasket 20 as described above in connection with FIG. 1.

Respective first and second ledge portions 38 and 42 form a cavity 44 into which at least a portion of second molded member 46 can be disposed. First and second ledge portions 38 and 42 thus secure second molded member 46 during expansion of ring 28 into one of its multiple locked expanded positions.

Both first and second molded members 30 and 46 have radii of curvature, as generally indicated by respective reference numerals 62 and 64 and associated lead lines. Radii of curvature 62 and 64 of respective first and second molded members 30 and 46 are designed to accommodate a particular range of opening diameters so that substantially continuous and uninterrupted circumferential surface 61 is presented to inner surface 18 of gasket 20. Radii of curvature 62 and 64 are varied depending on the range of pipe diameters to be accommodated.

FIG. 3 shows a partial side view of an alternative embodiment of an expandable compression ring 66 of the present invention. Expandable compression ring 66 includes first and second integrally molded members 68 and 70 that are attached to a strip 72. Strip 72 is made from a plastic material and first and second molded members 68 and 70 are made from a reinforced or non-reinforced plastic material that is relatively more expensive and of higher strength than the plastic material from which strip 72 is constructed. First and second molded members 68 and 70 include respective attachment portions 74 and 76. Attachment portions 74 and 76 include mortises 78 and 80 formed in first and second molded members 68 and 70 as shown in FIG. 3. Tenons 82 and 84 are formed on respective first and second ends 83 and 85 of strip 72. Tenons 82 and 84 are disposed in mortises 78 and 80 of respective molded members 68 and 70 to secure first and second molded members 68 and 70 to strip 72. Although not shown in FIG. 3, open mortise and tenon joints, such as the joints between mortises 78 and 80 and respective tenons 82 and 84, may be secured by one or more rivets. Closed mortise and tenon joints (i.e., those where the sides of mortises 78 and 80 are closed so that tenons 82 and 84 are not visible) may be secured with an adhesive applied between the mortise and tenon. It should be noted that while preferred embodiments of the present invention utilize mortises for connection with tenons formed on plastic strips, it is also possible to attach members 68 and 70 to strip 72 with the use of rivets only and no mortises and tenons.

First molded member 68 includes a first ledge portion 86 having teeth 88 formed on inner surface 98 and angled in a first direction. A second ledge portion 90 is formed on first molded member 68 so as to extend in the same general direction as first ledge portion 86 and form a cavity 92 into which a portion of second molded member 70 is disposed. First and second ledge portions 86 and 90 thus secure second molded member 70 during expansion of ring 66 into one of its multiple locked expanded positions. Second molded member 70 includes a plurality of teeth 94 formed on inner surface 100 and angled in a second direction generally opposite that of the first. Teeth 88 and 94 cooperate with one another to lock ring 66 into one of its multiple expanded positions.

Installation lugs 96 and 97 are formed on respective inner surfaces 99 and 100 of first and second molded members 68 and 70. Installation lugs 96 and 97 in cooperation with an expansion tool (not shown) expand ring 66 into one of its multiple locked positions. As with expandable compression ring 28, first and second molded members 68 and 70 have radii of curvature, as generally indicated by respective reference numerals 110 and 112 and associated lead lines, designed to accommodate a predetermined range of opening diameters so as to present a substantially continuous and uninterrupted circumferential surface 113 that exerts a generally uniform pressure on inner surface 18 of gasket 20. Also, as with expandable compression ring 28, portion 116 tapers to an end 114 to facilitate the provision of the above-described substantially continuous and uninterrupted circumferential surface.

FIG. 4 shows a partial side view of another embodiment of an expandable compression ring 120 of the present invention. Ring 120 includes respective first and second integrally molded members 122 and 124 that are attached to plastic strip 72. First and second molded members 122 and 124 are made from a reinforced or non-reinforced plastic material that is relatively more expensive and of higher strength than the plastic material from which strip 72 is constructed. First and second molded members 122 and 124 include respective attachment portions 126 and 128. Attachment portions 126 and 128 include mortises 130 and 132 formed in first and second molded members 122 and 124 as shown in FIG. 4. Tenons 134 and 136 are formed on respective first and second ends 138 and 140 of strip 72. Tenons 134 and 136 are disposed in respective mortises 130 and 132 to secure first and second molded members 122 and 124 to strip 72. Rivets 142 further secure tenons 134 and 136 within mortises 130 and 132. Although not shown, closed mortise and tenon joints (i.e., those where the sides of mortises 130 and 132 are closed so that tenons 134 and 136 are not visible) may be secured with an adhesive applied between the mortise and tenon. It should be noted that while preferred embodiments of the present invention utilize mortises for connection with tenons formed on plastic strips, it is also possible to attach members 122 and 124 to strip 72 with the use of rivets only and no mortises and tenons.

First member 122 lies on the outside of ring 120 and includes a plurality of teeth 144 formed on inner surface 145 and angled in a first direction. Second member 124 includes a plurality of teeth 146 formed on outer surface 147 and angled in a second direction generally opposite the first direction. Teeth 144 and 146 engage one another to lock ring 120 in one of its multiple expanded positions.

Installation lugs 148 and 150, formed on respective inner surfaces 145 and 151 of first and second molded members 122 and 124, are used in conjunction with an expansion tool (not shown) for expanding ring 120 into one of its multiple expanded positions. Alternatively, a recess 149 may be formed in an end 153 of second member 124 for use with the expansion tool instead of lugs 150. The ability to expand ring 120 into multiple positions allows for a range of opening diameters to be accommodated.

An upwardly extending tab 152 is formed on side 154 of first member 122. A downwardly extending tab 156 is formed on side 158 of second member 124. Tab 152 engages a side 73 of plastic strip 72 or side 158 of member 124 and tab 156 engages side 154 of member 122 to limit the lateral movement of members 122 and 124 relative to one another. Although not shown, a similar upwardly extending tab 152 may be formed on a side of first member 122 generally opposite side 154 and a similar downwardly extending tab 156 may be formed on a side of second member 124 generally opposite side 158. There are, however, advantages to molding tabs 152 and 156 on only one side of members 122 and 124 rather than on two sides. If tabs 152 and 156 are on only one side, then it is easier to mold members 122 and 124. When tabs 152 and 156 are on both sides of members 122 and 124, shrinkage subsequent to molding can become a problem if either or both members 122 and 124 contract to a point where it is difficult or impossible to insert the members between the tabs. In addition, formation of tabs on both sides is more expensive because additional molding elements, such as lifters, are required.

Portion 160 of first member 122 tapers to an end 162 to facilitate the provision of a substantially continuous and uninterrupted circumferential surface 164. Surface 164 of ring 120 is designed to provide a generally uniform pressure surface area on inner surface 18 of gasket 20 as described above in connection with FIG. 1.

Both first and second members 122 and 124 have radii of curvature as generally indicated by respective reference numerals 163 and 165 and associated lead lines. Radii of curvatures 163 and 165 of respective first and second members 122 and 124 are designed to accommodate a particular range of opening diameters so that substantially continuous and uninterrupted circumferential surface 164 is presented to inner surface 18 of gasket 20.

Figure 5:
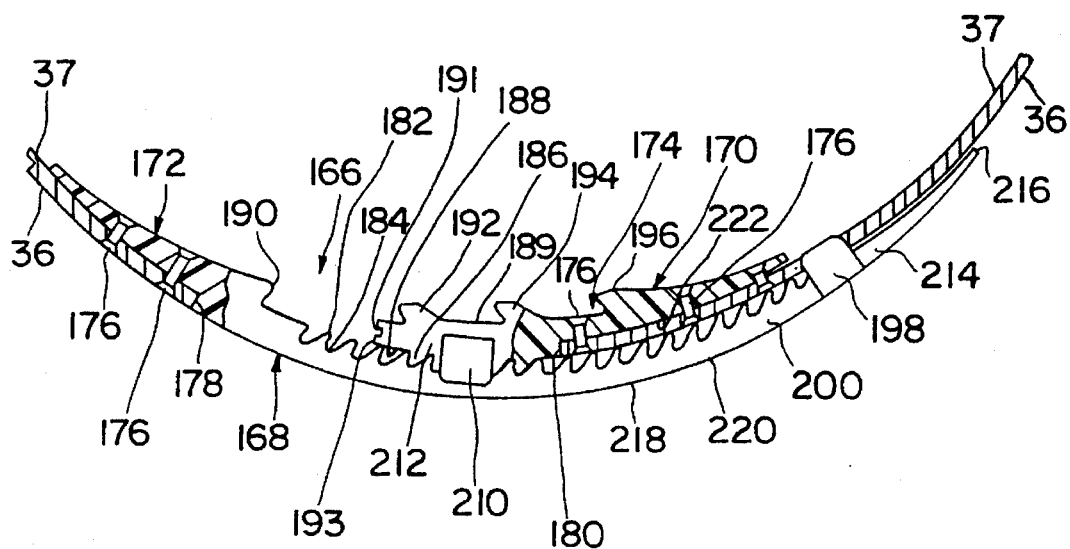
FIG. 5 shows a partial side view of another embodiment of an expandable compression ring having a different pair of molded members attached to the metal strip.

FIG. 5 shows a partial side view of another embodiment of an expandable compression ring 166 of the present invention. Ring 166 includes respective first and second integrally molded members 168 and 170 that are attached to metal strip 36. First and second molded members 168 and 170 are made from a reinforced or non-reinforced plastic material that is relatively more expensive than the metal from which strip 36 is constructed. In one embodiment, metal strip 36 is made from stainless steel and first and second molded members 168 and 170 are constructed from glass-fiber-reinforced nylon 6/6.

First and second molded members 168 and 170 include respective attachment portions 172 and 174. Fasteners 176, such as rivets, are used to attach first and second molded members 168 and 170 to respective first and second ends 178 and 180 of metal strip 36.

First member 168 lies on the outside of ring 166 and includes a plurality of teeth 182 formed on an inner surface 184 and angled in a first direction. Second member 170 also includes a plurality of teeth 186 formed on an outer surface 188 and angled in a second direction generally opposite the first direction. Teeth 182 and 186 engage one another to lock ring 166 in one of its multiple locked positions.

An installation lug 190 is formed on inner surface 184 of first member 168. First, second, and third installation lugs 192, 194, and 196 are formed on inner surface 189 of second member 170. As can be seen from FIG. 5, first, second, and third installation lugs 192, 194, and 196 are of differing shape. Installation lug 190 and one or more of installation lugs 192, 194, and 196 are used in conjunction with an expansion tool (not shown) for expanding ring 166 into one of its multiple expanded positions. Alternatively, a recess 191 may be formed in an end 193 of second member 170 for use with the expansion tool instead of one of the lugs 192, 194 or 196. The ability to expand ring 166 into multiple locked positions allows for a range of opening diameters to be accommodated.

An upwardly extending tab 198 is formed on side 200 of first member 168. A downwardly extending tab 210 is formed on side 212 of second member 170. Tab 198 engages a side 37 of metal strip 36 or side 212 of second member 170 and tab 210 engages side 200 of first member 168 to limit lateral movement of members 168 and 170 relative to one another. Although not shown, a similar upwardly extending tab 198 may be formed on a side of first member 168 generally opposite side 200 and a similar downwardly extending tab 210 may be formed on a side of second member 170 generally opposite side 212. There are, however, advantages to molding tabs 198 and 210 on only one side of members 168 and 170 rather than on two sides. If tabs 198 and 210 are on only one side, then it is easier to mold members 168 and 170. When tabs 198 and 210 are on both sides of members 168 and 170, shrinkage subsequent to molding can become a problem if either or both members 168 and 170 contract to a point where it is difficult or impossible to insert the members between the tabs. In addition, formation of tabs on both sides is more expensive because additional molding elements, such as lifters, are required.

Portion 214 of first member 168 tapers to an end 216 to facilitate the provision of a substantially continuous and uninterrupted circumferential surface 218. Surface 218 of ring 166 is designed to provide a generally uniform pressure surface area on inner surface 18 of gasket 20 as described above in connection with FIG. 1.

Both first and second integrally molded members 168 and 170 have radii of curvature, as generally indicated by respective reference numerals 220 and 222 and associated lead lines. Radii of curvatures 220 and 222 of respective first and second members 168 and 170 are designed to accommodate a particular range of opening diameters so that substantially continuous and uninterrupted circumferential surface 218 is presented to inner surface 18 of gasket 20.

FIG. 6 illustrates a side view of a strip 224 formed from either metal or plastic having a first molded member 226 attached thereto as generally indicated by arrow 228 and a second molded member 230 also attached thereto as generally indicated by arrow 232. FIG. 7 illustrates a side view of a pair of strips 224 formed from either metal or plastic with two pairs of integrally molded members 226 and 230. The two pairs of molded members 226 and 230 are used to interconnect strips 224 together. It is to be understood, however, that one pair of molded members 226 and 230 may be replaced with an equivalent structure that will align and secure a first end 234 of a strip 224 adjacent a second end 236 of another strip 224 so as to form a closed ring. One such structure might be a bracket into which first and second ends 234 and 236 are disposed.

FIGS. 6 and 7 together are intended, in part, to illustrate the modularity of the present invention. That is, the same length of strip 224 and same first and second molded members 226 and 230 can be used to accommodate a wide range of opening diameters without having to change the dimensions thereof. FIG. 8 shows a side view of three strips 224 and three pairs of integrally molded members 226 and 230 that further emphasize the modularity of the present invention. In this embodiment of the present invention, up to two pairs of molded members 226 and 230 may be replaced with equivalent aligning and securing structure, such as brackets, as discussed above in connection with FIG. 7, so that only one set of molded members 226 and 230 are necessary to form a closed ring.

The modularity of the expandable compression ring of the present invention has at least one advantage of allowing the same length and dimensions of strips 224 and members 226 and 230 to be used to accommodate a wider range of opening diameters than would generally be available through the utilization of unitary strips. This means that fewer molds and machines need to be made to form different lengths of molded members and strips because a wider range of opening diameters can be accommodated with a given strip and member length. This has the advantage of reducing equipment costs as well as manufacturing costs associated with both hiring labor to run machines and providing floor space to accommodate machines.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An apparatus for outwardly radially compressing a gasket into sealing engagement with a wall of an opening, comprising:

a continuous strip of resiliently flexible material having first and second ends; and first and second members made from a different material than the strip and respectively attached to the first and second ends of the strip thereby forming a ring, the first and second members being configured to include locking structure that both fixes the ring in an expanded position adjacent the gasket and secures against contraction of the ring by the gasket.

2. The apparatus of claim 1, wherein said first and second members include means for cooperating with a force exerting means for moving said strip into the expanded position.

3. The apparatus of claim 2, wherein said cooperating means comprises an installation lug formed on each of the first and second members.

4. The apparatus of claim 1, further comprising an installation lug formed on said first member and further wherein an end of said second member is configured to include a recess.

5. The apparatus of claim 1, wherein peripheries of said strip and said members present a substantially continuous and uninterrupted exterior circumferential surface so that said apparatus exerts a generally uniform pressure on an inner surface of the gasket to thereby seal the opening in the wall.

6. The apparatus of claim 1, wherein said strip is made of one of plastic and stainless steel.

7. The apparatus of claim 1, wherein said members are made of one of reinforced plastic, non-reinforced plastic, and glass-fiber-reinforced nylon 6/6.

8. The apparatus of claim 1, wherein said strip is made from one of metal and plastic, and further wherein said first and second members are attached to the strip by a plurality of rivets.

9. The apparatus of claim 1, wherein said strip is made of plastic, and further comprising tenons formed on the first and second ends of said strip that are disposed in mortises formed in said members to attach the members to the strip.

10. The apparatus of claim 1, wherein said locking structure comprises cooperating projections.

11. The apparatus of claim 10, wherein said projections are teeth-like structures on said first and second members that are angled in generally opposite directions.

12. The apparatus of claim 1, wherein said strip and said members are expandable into multiple locked positions.

13. The apparatus of claim 1, wherein said members have radii of curvature designed to accommodate a range of opening diameters so that said members and strip present a substantially continuous and uninterrupted exterior circumferential surface and exert a generally uniform pressure on an inner surface of the gasket.

14. The apparatus of claim 13, wherein an edge portion of said first member and a portion adjacent thereto taper so as to facilitate the provision of the substantially continuous and uninterrupted circumferential surface.

15. The apparatus of claim 1, further comprising means formed on said first member for capturing said second member so as to secure said second member during expansion of said strip.

16. The apparatus of claim 15, wherein said capturing means includes a first ledge portion and a second ledge portion extending in the same general direction as said first ledge portion, said first and second ledge portions defining a cavity into which at least a portion of said second member is disposed.

17. The apparatus of claim 1, further comprising guide means on said first and second members for limiting lateral movement of said first and second members relative to one another.

18. The apparatus of claim 17, wherein said guide means includes a tab formed on a first side of the first member that engages one of a first side of the second member and a first side of the strip, and a tab formed on the first side of the second member that engages the first side of the first member.

19. An apparatus for outwardly radially compressing a gasket into sealing engagement with a wall of an opening, comprising:

a plurality of continuous strips of resilient flexible material, each of said strips having first and second ends; and means for aligning and securing the first end of each one of said strips adjacent the second end of another of said strips so as to form a closed ring, said aligning and securing means including at least one set of first and second members made from a different material than the strips and attached to respective ends of adjacent strips, the first and second members being configured to include locking structure that both fixes the ring in an expanded position adjacent the gasket and secures against contraction of the ring by the gasket.

20. The apparatus of claim 19, wherein said first and second members include means for cooperating with a force exerting means for moving said strips into the expanded position.

21. The apparatus of claim 19, wherein said strips are made of one of plastic and stainless steel.

22. The apparatus of claim 19, wherein said members are made of one of reinforced plastic, non-reinforced plastic, and glass-fiber-reinforced nylon 6/6.

23. The apparatus of claim 19, wherein said members have radii of curvature designed to accommodate a range of opening diameters so that said strips and said members present a substantially continuous and uninterrupted exterior circumferential surface on an inner surface of the gasket.

24. The apparatus of claim 23, wherein edge portions of said first member and a portion adjacent thereto taper so as to facilitate the provision of said substantially continuous and uninterrupted circumferential surface.

25. The apparatus of claim 19, wherein said strips are made from one of metal and plastic, and further wherein said first and second members are attached to the strip by a plurality of rivets.

26. The apparatus of claim 19, wherein said strips are made from plastic and further comprising tenons formed on the first and second ends of said strips that are disposed in mortises formed in said members to attach the members to the strip.

27. The apparatus of claim 19, further comprising means formed on said first member for capturing said second member so as to secure said second molded member during expansion of said strips.

28. The apparatus of claim 27, wherein said capturing means includes a first ledge portion and a second ledge portion extending in the same general direction as said first ledge portion, said first and second ledge portions defining a cavity into which at least a portion of said second member is disposed.

29. The apparatus of claim 19, further comprising guide means on said first and second members for limiting lateral movement of said first and second members relative to one another.

30. The apparatus of claim 29, wherein said guide means includes a tab formed on a first side of the first member that engages one of a first side of the second member and a first side of the strip, and a tab formed on the first side of the second member that engages the first side of the first member.

31. The apparatus of claim 19, wherein said locking structure comprises cooperating projections.

32. The apparatus of claim 19, wherein said first and second members provide a range of adjustability of the circumference of said closed ring.

33. The apparatus of claim 32, wherein said aligning and securing means includes two or more sets of first and second members that provide an additional range of adjustability of the circumference of said closed ring.

* * * * *